Dec. 14, 1943.  J. J. HOPFIELD  2,336,544
METHOD OF FABRICATING MULTIPLE GLASS SHEET GLAZING UNITS
Filed April 22, 1939  3 Sheets-Sheet 1

Inventor
JOHN J. HOPFIELD.

By Frank Fraser
Attorney

Dec. 14, 1943.    J. J. HOPFIELD    2,336,544
METHOD OF FABRICATING MULTIPLE GLASS SHEET GLAZING UNITS
Filed April 22, 1939    3 Sheets-Sheet 2

Inventor
JOHN J. HOPFIELD.
By Frank Fraser
Attorney

Dec. 14, 1943.   J. J. HOPFIELD   2,336,544
METHOD OF FABRICATING MULTIPLE GLASS SHEET GLAZING UNITS
Filed April 22, 1939   3 Sheets-Sheet 3

Inventor
JOHN J. HOPFIELD.
By Frank Fraser
Attorney

Patented Dec. 14, 1943

2,336,544

UNITED STATES PATENT OFFICE 2,336,544

METHOD OF FABRICATING MULTIPLE GLASS SHEET GLAZING UNITS

John J. Hopfield, Toledo, Ohio, assignor to Libbey-Owens-Ford Glass Company, Toledo, Ohio, a corporation of Ohio Application April 22, 1939, Serial No. 269,359

6 Claims. (Cl. 154—28)

The present invention relates to a multiple glass sheet glazing unit and to the method of producing the same.

It is an aim of this invention to provide an improved type of single unit multiple glass sheet glazing construction comprising two or more sheets of glass spaced apart by metallic separating means which are bonded to the glass sheets entirely around the marginal portions thereof through the intermediary of a metallic coating or coatings to form an all glass-metal, hermetically sealed structure.

An important object of the invention is the provision of an all glass-metal multiple glazing unit of this character embodying one or more sheets of laminated safety glass (comprising two or more sheets of glass and one or more plastic interlayers) whereby to combine both safety and heat insulation in a structure of this type.

Another important object of the invention is the provision of an improved method of fabricating an all glass-metal multiple glazing unit of this character wherein the metallic separating means may be secured to the sheet or sheets of laminated safety glass without causing any discoloration or in any way detrimentally affecting the plastic interlayer or interlayers and also without danger of injuring or weakening the bond between the plastic and glass.

Other objects and advantages of the invention will become more apparent during the course of the following description when taken in connection with the accompanying drawings.

In the drawings, wherein like numerals are employed to designate like parts throughout the same:

Figure 1:
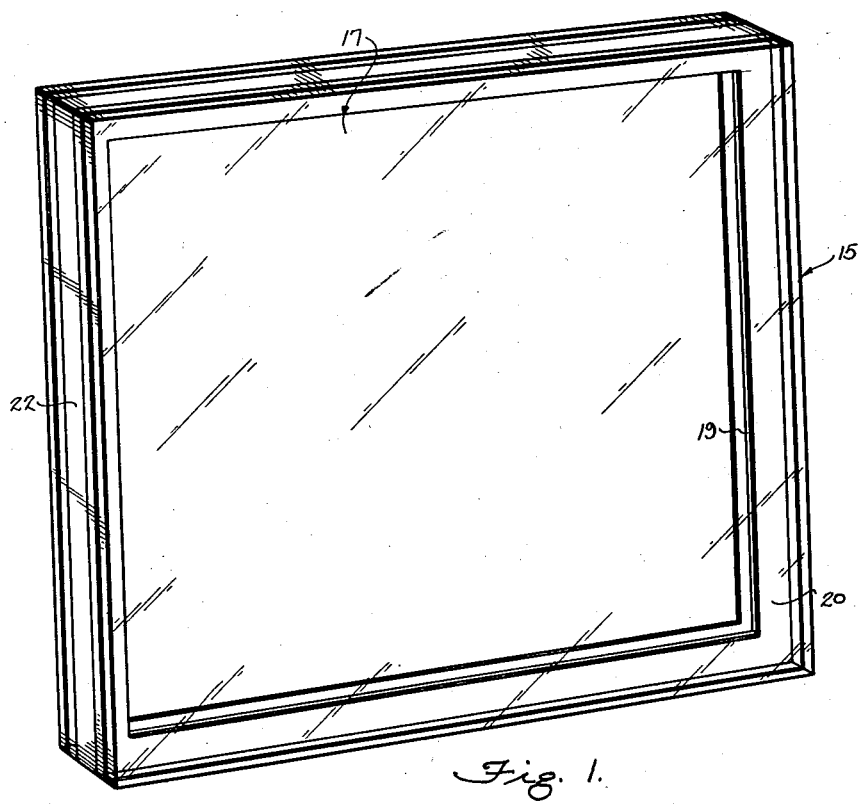
Fig. 1 is a perspective view of one form of multiple glass sheet glazing unit produced in accordance with the invention.
Figure 2:
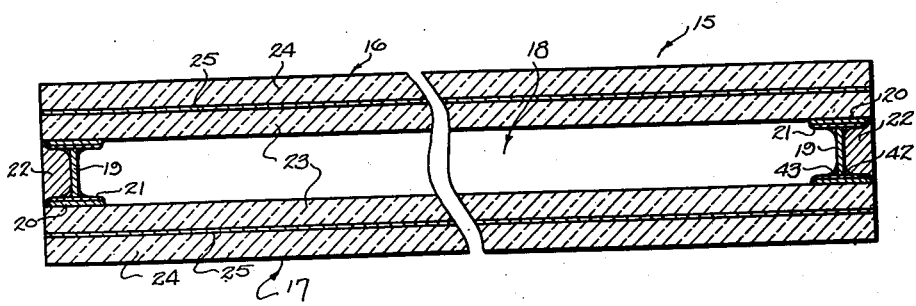
Fig. 2 is a vertical transverse section through the glazing unit.

Referring particularly to Figs. 1 and 2, the numeral 15 designates in its entirety a finished multiple glass sheet glazing unit produced in accordance with my invention. As will be readily appreciated, two or more sheets of glass can be fabricated into a glazing unit of this character, giving one or more spaces between adjacent glass sheets as occasion may require. Therefore, while the invention has been illustrated in the drawings and will be herein described as applied to a two-sheet unit, it will be understood that the invention is in no way confined to any particular number of glass sheets used or spaces between the sheets.

The glazing unit 15 consists generally of two sheets of laminated safety glass 16 and 17 arranged in spaced, substantially parallel relation to provide an insulating air space 18 therebetween. Broadly speaking, this air space is formed by the use of metal separator strips 19 joined to the glass sheets through the intermediary of the metallic coatings 20 and 21. The separator strips 19 may be arranged inwardly of the outer edges of the glass sheets, if desired, to form a channel which may be filled with a suitable weather-proof seal 22. The seal 22 may consist either of an organic or metallic material. However, the use of the sealing material may not always be required and, likewise, the separator strips can be associated with the glass sheets so that they are flush with the peripheral edges thereof if desired.

Each sheet of laminated safety glass 16 and 17 comprises the two sheets or plates of glass 23 and 24 bonded to an interpose layer of plastic material 25 to provide a composite structure. The interlayer 25 may be of any suitable organic plastic or resinous material and the edges of the composite sheets may be sealed or not, as preferred.

In view of the fact that the inner surfaces of the two sheets of safety glass cannot be cleaned after the unit is made and installed, it is highly desirable to use glass which is stable when in use. Likewise, before the unit is completed, the inner surfaces of the composite sheets should be thoroughly cleaned not only for sake of appearance and permanency of unit, but also to facilitate application of the metallic coatings upon the glass in a manner to obtain permanent and adequate adhesion or bond between the glass and metal.

Although not necessary, it is preferred that the coatings 20 on the inner glass sheets 23 be produced from pure copper, as I have found that pure copper can be sprayed upon the glass very satisfactorily. It is important, however, that the temperature of the glass be properly controlled at the time the metal is applied to it. It may be mentioned that bronze can also be used in lieu of copper, and no doubt other satisfactory metals or metal alloys or multiple coats of different metals can be substituted for the copper coatings.

I also prefer that the separator strips 19 be made from lead and that the lead separator strips and copper coatings be joined together by means of specially prepared solder or other inorganic bonding material. The soldering of the parts together is, in effect, a sweat job, and the materials are so controlled, both as to composition and form, that reinforcing or strengthening fillets or accumulations of solder are formed on both sides of the separator strips to strengthen the construction and thus help insure its permanency as will be more clearly hereinafter described.

In fabricating a multiple glazing unit using metallic separating means, I have found that the edge portions of the glass sheets should be heated to around 600 degrees Fahrenheit in order to secure a good bond between the metallic coatings and glass, especially if copper is used. The use of this relatively high temperature, however, introduces a condition that precludes the spraying of sheets of laminated safety glass of the type shown in Fig. 2 with metal. In other words, the heating of the edges of sheets of laminated safety glass to this high a temperature would have an adverse effect upon the plastic interlayer 25 and the permanency of bond between the plastic interlayer and glass sheets. In order to overcome these objections and thereby permit the production of a satisfactory multiple glass glazing unit, including one or more sheets of laminated safety glass sealed with metallic separating means, I propose that the metallic coatings 20 and 21 be applied to one of the sheets of glass, forming the safety glass sandwich, before the glass sheets are laminated with the plastic interlayer.

Briefly, in carrying out the method, one of the glass sheets that is to be made into the safety glass sandwich has applied to one of its surfaces, around the marginal portions thereof, a metallic coating 20, and this is achieved preferably by spraying molten copper upon the glass. After the copper coating has been applied, a thin layer of solder 21 can be put onto the sprayed copper to give it additional protection in the laminating process as well as making subsequent soldering of the metallic separator strip easier. Having applied the desired metal coatings to the glass sheet, it can then be combined with another sheet of glass and an interposed plastic interlayer to form a sheet of laminated safety glass. The metallic coatings will, of course, be disposed upon the outer surface of the composite sheet.

The sheet of safety glass can then be combined either with another and like sheet of safety glass or with a sheet of ordinary glass, also provided with a metal border, to produce a hermetically sealed, heat insulating unit with safety glass features. In the fabrication of the unit and more specifically the soldering of the metallic separator strip to the metal borders on the glass sheets, the rise of temperature of the glass occasioned by the soldering operation will not be sufficient to detrimentally affect the organic plastic or resin interlayer or the bond between the plastic and glass. This is due to the fact that a relatively low melting point solder is used.

Figure 3:
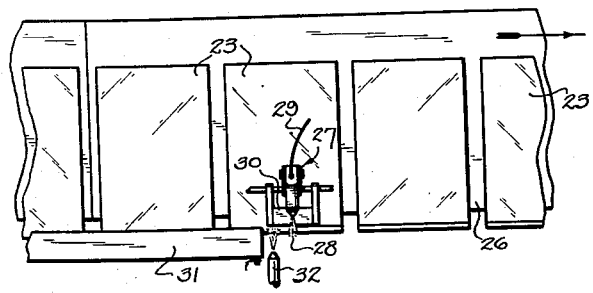
Fig. 3 is a fragmentary plan view of one form of apparatus which may be used for heating the edges of the glass sheets and for applying a metallic coating along the marginal portions thereof.

The carrying out of the several steps of the method herein provided to produce the finished multiple glazing unit are illustrated more specifically in Figs. 3 to 9, to which reference will now be had. In Fig. 3 is illustrated diagrammatically that portion of an assembly table where the copper or other metal coating is applied to the marginal portions of the glass sheets. As shown, the glass sheets 23 to be metallized rest upon and are carried forwardly by a conveyor 26 beneath a metallizing gun 27. This gun may be of any construction capable of producing a spray of metal 28 which can be directed upon the preselected portions of the glass sheet moving thereunder. While it may be possible to apply the metal coating to the glass electrolytically or otherwise, I have had best results when using a spray gun in which the metal wire 29 is fed into the gun, melted, and sprayed in fine particles upon the glass. The deposit of metal upon the glass is not only controlled by the relative position of the gun with respect to the glass, speed of wire through the gun, and speed of movement of the glass, but also by a guard member 30 which may be specially designed for this particular purpose.

Before the metal is sprayed upon the glass, the marginal portions of the glass sheet are first heated to the desired temperature and this heating is of vital importance not only in preventing thermal shock of the glass itself, but also to enable a proper bonding of the metal to the glass. The exact temperature used will vary somewhat with the size and thickness of glass, but in all cases care should be exercised to avoid warpage of the glass and heating should be confined to that area below the critical annealing point of the glass, it being borne in mind that the bond between the glass and metal improves as the temperature of the glass is increased. Therefore, the temperature of the marginal portion of the glass sheet to be sprayed with metal is preferably as near the critical annealing point of the glass as is practically possible. For ordinary plate and window glass, I have found a temperature of between 500 and 600 degrees Fahrenheit to be satisfactory. Heating of the glass in this way prior to spraying of the metal thereon results in an excellent bond between the glass and metal.

As the glass sheet is carried along by the conveyor 26 and before it reaches the spray gun 27, the forward edge of the sheet which projects beyond the conveyor passes through an electrical heating member 31. The number of heaters and length of heating zone are dependent naturally upon the speed of the machine and exact operating temperatures desired. It is preferred that heating be done as rapidly as possible and confined to a narrow strip at the edge of the glass. This serves to confine the compressional strain to a narrow band and helps to prevent warping and breaking of the glass. After the glass passes beyond the heating member 31 and just before the metal is sprayed thereon, it is subjected to the action of the burner 32 which heats the surface of the glass to the desired maximum temperature for the reception of the metal spray. The heating means is so controlled that when the glass reaches a position under the spray gun, it is within the predetermined temperature range desired.

Figure 4:
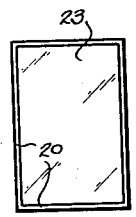
Fig. 4 is a face view of one of the glass sheets, with the metallic coating applied entirely around the marginal portions thereof.

The conveyor 26 is moved continuously and successive sheets of glass are presented progressively to the spray of metal 28 issuing from the gun 27. After the glass has been coated with the metal, it is desired that means be provided for permitting a gradual lowering of the glass temperature to that of the surrounding atmosphere. It is also preferred that the metallic coating be applied to the glass in such a manner that the coating tapers off to give a so-called feather edge, as indicated at 33 in Fig. 10. The edge of the glass itself may also be slightly beveled as at 34, if desired. After one edge or marginal portion of the glass sheet has been coated and featheredged, it is of course necessary to similarly treat the remaining edges or marginal portions before fabricating the glass into a double glazing unit. A glass sheet having the four marginal portions thereof coated with metal is illustrated in Fig. 4.

After the glass sheet has been provided with the metal border 20, it is further prepared by applying thereto a layer 21 of relatively softer metal, and this may be in the nature of a solder composition. The use of ordinary solders results in relatively high working temperatures with the soldering irons or other sources of heat whereby undesirable strains are set up between the copper coat and the glass. I use a low melting point solder with a wide plastic range of melting so as to reduce the temperature of applications and make use of a more plastic range of the solidifying points of the solder for the purpose of easier assembly.

There are a number of variations of soft solders which can be used, but I favor the use of a solder, which tests have indicated has the least alloy reaction or electrolytic action. It consists of approximately 33 parts of bismuth, 25 parts of lead, and 42 parts of tin.

Figure 5:
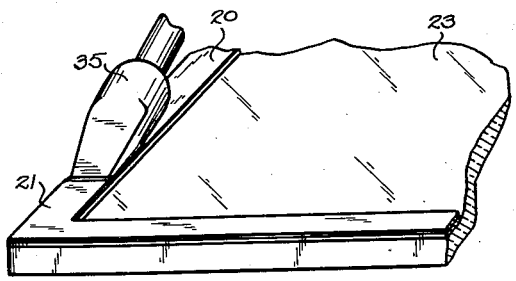
Fig. 5 is a fragmentary perspective view illustrating the depositing of a solder coating upon the metallized border of the glass sheet.

As a matter of precaution and to insure the utmost of cleanliness, a flux may be and preferably is used to get a permanent satisfactory union between the solder layer and the metal coating on the glass. Zinc chloride dissolved in water makes an excellent flux, and ordinarily I prefer to make it as dilute as possible. A film of the flux material can be applied to the metallic coating 20 by means of a brush or in any other desired manner. The flux treated metallic coating may then be covered with a layer of solder as shown in Fig. 5 wherein a soldering iron 35 is being run over the metallic coating to leave the solder layer 21.

Figure 6:
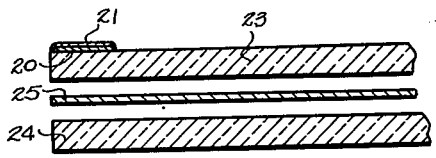
Fig. 6 is a sectional view illustrating the assembly of the metallized glass sheet with a second sheet of glass and an interposed layer of plastic material to form a safety glass sandwich.
Figure 7:
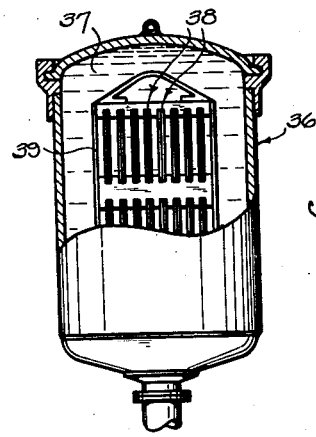
Fig. 7 is a view, partially in section, of an autoclave in which the assembled laminations of the sandwich are bonded together to produce a sheet of laminated safety glass.

After the metallic coating 20 and layer of solder 21 have been applied to the glass sheet, the said sheet is adapted to be united with a second sheet of glass and an interposed layer of plastic material to form a sheet of laminated safety glass. As shown in Fig. 6, the glass sheet 23, containing the metallic coatings 20 and 21, is assembled with a second sheet of glass 24 and an interposed layer of plastic material 25 to form a sandwich. Any suitable plastic interlayer may be used and may be bonded either directly to the glass sheets or through interposed layers or films of adhesive material.

After the laminations have been properly assembled, they are adapted to be united by the application of heat and pressure to form a unitary structure, and this is preferably achieved by placing the glass-plastic sandwich within an autoclave 36 (Fig. 7) containing a body of pressing liquid 37. The glass-plastic sandwiches are designated at 38 and are carried in a suitable rack 39. Any desired temperature and pressure may be maintained within the autoclave to effect the uniting of the several laminations to obtain a composite structure. The layer of solder 21 serves to protect the copper or other metallic coating 20 during the bonding of the laminations. While this method of bonding the laminations together is preferred, it is to be understood that the invention is not restricted to any particular process for uniting the laminations or to any special materials used for the plastic interlayer and/or bonding material.

The separator strip 19 is preferably made of lead. I have found pure lead strips to be too susceptible to alloy action and melting under the action of the solders, so preferably use lead containing 3% of antimony providing a slightly stiffer lead strip and capable of greater abuse in the soldering operations. The thickness of the lead strips used may be from $1/64$ of an inch to $1/32$ of an inch, the thickness preferably being .024 of an inch, which has been used with satisfactory results from both strength and workability, but obviously the thickness can be varied as desired.

Figure 8:
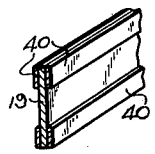
Fig. 8 is a fragmentary perspective detail view showing the metal separator strip after it has been precoated in the desired manner with solder.

To enable joining of the separator strips to the metal coated glass sheets, I apply to both sides of the strips along the marginal edges thereof first a flux and then a deposit of solder. Any preferred method of building up solder deposits on the strips may of course be employed, and in Fig. 8 is indicated approximately the appearance of a separator strip 19 after it has been prepared with the solder deposits 40. The strip is now ready for its association with the glass sheets.

The solder 40 applied to the edges of the lead separator strip 19 consists of a low melting point solder preferably consisting of 20 parts of bismuth, 40 parts of lead, and 40 parts of tin. This solder has a wide plastic range with a minimum plastic temperature of approximately 209 degrees Fahrenheit. The advantage of using these low melting point solders is also of benefit during the time of sweating the soldered copper surface to the soldered lead separator strip, whereby a low temperature iron may be used without melting down the lead strip.

Figure 9:
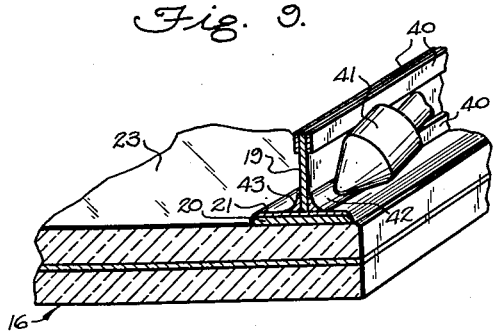
Fig. 9 is a fragmentary perspective view showing the bonding or sweating of the metal separator strip to a sheet of laminated safety glass.

To join the prepared separator strip 19 to one of the sheets of laminated safety glass, it is associated therewith substantially as shown in Fig. 9. Any suitable jigs or other means may be employed to facilitate proper positioning of the separator strip with respect to the glass. Ordinarily, it is desirable to place the separator strip back from the edge of the sheet and approximately centrally of the metal coating 21 to produce the channel for receiving the weatherproofing material. This is of course a matter of choice. An electric iron 41 or other heating means may be employed to elevate the temperature of the solder deposits 40 and the solder coating 21 to induce flowing of the solder to produce a fillet 42 on one side of the separator strip and a second fillet 43 on the opposite side of said strip. In this way, the solder completely surrounds the edge of the lead separator strip, giving what may be called a sweat joint and producing fillets on both sides of the separator strip to give a balanced type of joint capable of standing strain and stresses in both directions laterally of said separator strip.

For purposes of illustration, the fillets 42 and 43 are shown as separate from the solder coating 21 on the metallized films 20. While these solder deposits are of course independent of one another initially, part of the solder being applied originally to the separator strip and the other solder being applied to the metallized coating on the glass, during the joining together, as shown in Fig. 9, the solder of course blends or amalgamates into a single mass or volume of solder permanently adherent to the separator strip and metallized coating on the glass and shaped as fillets for mechanical strength.

In joining the separator strip to the first sheet of safety glass, it is obviously possible to apply the soldering iron to both sides of the separator strip for soldering purposes, but this of course is impossible when the second sheet of safety glass is being joined to the separator strip. However, by preparing the separator strips with substantial deposits of solder on both sides thereof in a manner such as is illustrated in Fig. 8, the heat applied on one side of the separator strip is sufficient to cause proper flowing of the solder on both sides. That is, in Fig. 9 proper control of temperature application with the iron 41 in the manner shown will result in the formation of not only the fillet 42 upon that side of the separator strip in contact with the iron, but will also result in formation of the fillet 43 on the opposite side of the separator strip. It has been found that the separator strip can be soldered to one sheet of safety glass in the manner shown rapidly enough so that the solder deposits along the other edge of the separator will not be disturbed, leaving them in proper condition for joinder to the second sheet of safety glass.

Figure 10:
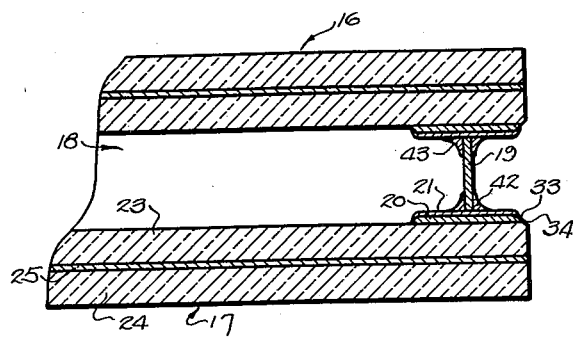
Fig. 10 is a fragmentary transverse vertical section through the glazing unit after the metal separator strip has been secured in position between two sheets of laminated safety glass.

After the separator strip has been joined to the first sheet of safety glass, the assembly so formed is then preferably inverted over a second sheet of safety glass, as indicated in Fig. 10, and the soldering job completed by operating the iron or other heating element on the exterior coating of solder carried by the separator strip. This, as has already been explained, will result in sweating together or joining of the separator strip and prepared metal coatings on the glass as well as formation of the fillets 42 and 43.

I have found that one length of separator strip 19 can be used around the marginal portions of the glass sheets and the meeting ends of the strip can easily be soldered together to produce an air tight and moisture proof space between the sheets. However, it is not necessary that one continuous length of separator strip be used, as one strip can be used for each side and the meeting ends of the independent strips soldered or sweated together. The rise of temperature of the glass, such as is caused in the soldering operation, is not sufficient to detrimentally affect the resin or plastic interlayer.

After the glass sheets and separator strip have been joined together and to insure desired permanency, it is preferred to establish a predetermined air or gas condition within the space between the glass sheets. To accomplish this, the separator strips may be punctured at two or more points to permit insertion of hypodermic needles or other instruments which allow passage of dehydrated air through the space to prevent later condensation in the space or fogging of the unit when in use. In most cases, dehydrated air at normal atmospheric pressure will be satisfactory. For other uses, a partially evacuated condition or even a pressure above atmospheric pressure may be desirable. Likewise, inert gases may be sealed within the unit for some uses. A simple method of controlling pressure or lack of pressure within the unit is to control the temperature of the unit and gas during dehydration and just prior to sealing of the openings through which the needles are inserted. After the gas content has been established and immediately upon removal of the needles from the separator strips, the openings are soldered to prevent ingress or egress of gas. The unit is then ready for use and can be installed without further preparation. As pointed out above, however, the channel around the edge of the unit is preferably filled with a suitable sealing compound 22 which may be either an organic or inorganic weather-proofing material.

From the above, it will be seen that there has been provided a multiple glass sheet glazing unit combining both safety and heat insulating features. Such a unit would be especially useful in pullman cars, busses, and even in passenger automobiles where safety glass is required or desired and where air conditioning is or may be used. By spraying the metal coating upon one of the glass sheets, that is to be made into a safety glass sandwich, before laminating the sheets with the organic interlayer, metallic separating means can be employed without adversely affecting the plastic interlayer. As explained above, the temperature required for soldering the metal separator strip in place is not sufficiently high as will adversely affect the plastic interlayer or the bond between the interlayer and glass sheets. In some instances, the layer of solder 21 need not be applied to the metal coating 20 until after the sheet of safety glass has been produced. In such case, the layer of solder 21 may be applied without adversely affecting the plastic interlayer. It is preferred, however, that the solder coating be applied to the copper before the sheet of safety glass is made as it affords added protection therefor.

Figure 11:
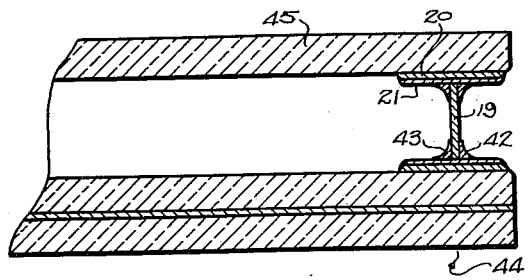
Fig. 11 is a view similar to Fig. 10, but showing a unit including only a single sheet of laminated safety glass combined with a sheet of ordinary plate or window glass.

Instead of using two sheets of safety glass as in Fig. 10, a unit such as shown in Fig. 11 may be produced combining a single sheet of safety glass 44 with a sheet of ordinary plate or window glass 45. In fabricating this unit, the sheet of safety glass 44 and the sheet of ordinary glass 45 are united with one another around the marginal portions thereof by the metal separator means 19 in the same manner as the unit in Fig. 10.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of fabricating a multiple glass sheet glazing unit, which comprises metallizing one surface of a sheet of glass to form a metal ribbon around the marginal portions thereof, bonding the glass sheet with a second sheet of glass and an interposed layer of plastic material to form a sheet of laminated safety glass, the metal ribbon being disposed upon the outer surface of the respective glass sheet, securing a metallic separator strip to said metal ribbon inwardly of the edges of the glass sheet and also inwardly of the opposite edges of the metal ribbon, and then securing said metallic separator strip to a metal ribbon formed upon a second sheet of glass arranged substantially parallel with the sheet of laminated safety glass to create a hermetically sealed space therebetween.

2. The method of fabricating a multiple glass sheet glazing unit, which comprises metallizing one surface of a sheet of glass to form a metal ribbon around the marginal portions thereof, applying a coating of solder to the metal ribbon, bonding the glass sheet with a second sheet of glass and an interposed layer of plastic material to form a sheet of laminated safety glass, the metal ribbon and solder coating being disposed upon the outer surface of the respective glass sheet, securing a metallic separator strip to said solder coating inwardly of the edges of the glass sheet and also inwardly of the opposite edges of the metal ribbon, and then securing said metallic separator strip to a solder coating formed upon a second sheet of glass arranged substantially parallel with the sheet of laminated safety glass to create a hermetically sealed space therebetween.

3. The method of fabricating a multiple glass sheet glazing unit, which comprises spraying a metal ribbon upon one surface of a sheet of glass around the marginal portions thereof, bonding the glass sheet with a second sheet of glass and an interposed layer of plastic material to form a sheet of laminated safety glass, the metal ribbon being disposed upon the outer surface of the respective glass sheet, soldering a metallic separator strip to said metal ribbon inwardly of the edges of the glass sheet and also inwardly of the opposite edges of the metal ribbon, and in then soldering said metallic separator strip to a metal ribbon formed upon a second sheet of glass arranged substantially parallel with the sheet of laminated safety glass to create a hermetically sealed space therebetween.

4. The method of fabricating a multiple glass sheet glazing unit, which comprises spraying a metal ribbon upon one surface of a sheet of glass around the marginal portions thereof, applying a coating of solder to the metal ribbon, bonding the glass sheet with a second sheet of glass and an interposed layer of plastic material to form a sheet of laminated safety glass, the metal ribbon and solder coating being disposed upon the outer surface of the respective glass sheet, soldering a lead separator strip to said solder coating inwardly of the edges of the glass sheet and also inwardly of the opposite edges of the metal ribbon, and in then soldering said lead separator strip to a solder coating formed upon a second sheet of glass arranged substantially parallel with the sheet of laminated safety glass to create a hermetically sealed space therebetween.

5. The method of fabricating a multiple glass sheet glazing unit, which comprises spraying a copper ribbon upon one surface of a glass sheet around the marginal portions thereof, bonding the glass sheet with a second sheet of glass and an interposed layer of plastic material to form a sheet of laminated safety glass, the copper ribbon being disposed upon the outer surface of the respective glass sheet, soldering one edge of a metal separator strip to said copper ribbon inwardly of the edges of the glass sheet and also inwardly of the opposite edges of the metal ribbon and through the intermediary of solder fillets formed on both sides of said strip, and in then soldering the other edge of said separator strip to a copper ribbon formed upon a second sheet of glass arranged substantially parallel with the sheet of laminated safety glass to create a hermetically sealed space therebetween.

6. The method of fabricating a multiple glass sheet glazing unit, which comprises spraying a copper ribbon upon one surface of a glass sheet around the marginal portions thereof, coating said copper ribbon with a layer of solder, bonding the glass sheet with a second sheet of glass and an interposed layer of plastic material to form a sheet of laminated safety glass, the copper ribbon and solder coating being disposed upon the outer surface of the respective glass sheet, soldering one edge of a metal separator strip to the solder coating inwardly of the edges of the glass sheet and also inwardly of the opposite edges of the metal ribbon and to produce fillets on both sides of the said strip, and then soldering the other edge of said separator strip to a second sheet of glass arranged substantially parallel with the sheet of laminated safety glass to create a hermetically sealed space therebetween.

JOHN J. HOPFIELD.